United States Patent
Nagano (10) Patent No.: US 10,605,982 B2
(45) Date of Patent: Mar. 31, 2020

(54) MULTICORE OPTICAL FIBER WITH A CORE AND A COMMON CLADDING HAVING A HIGHER REFRACTIVE INDEX THAN THE CORE, FIBER BRAGG GRATING, AND METHOD FOR MANUFACTURING FIBER BRAGG GRATING

(71) Applicant: SUMITOMO ELECTRIC INDUSTRIES, LTD., Osaka-shi, Osaka (JP)

(72) Inventor: Shigehiro Nagano, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 16/152,525

(22) Filed: Oct. 5, 2018

(65) Prior Publication Data

US 2019/0041575 A1 Feb. 7, 2019

Related U.S. Application Data

(63) Continuation of application No. PCT/JP2017/017033, filed on Apr. 28, 2017.

(30) Foreign Application Priority Data

May 12, 2016 (JP) ................. 2016-096097

(51) Int. Cl.
*G02B 6/02* (2006.01)
*G02B 6/036* (2006.01)

(52) U.S. Cl.
CPC ..... *G02B 6/02138* (2013.01); *G02B 6/02042* (2013.01); *G02B 6/03655* (2013.01)

(58) Field of Classification Search
CPC ............ G02B 6/02138; G02B 6/03655; G02B 6/02042
See application file for complete search history.

(56) References Cited

U.S. PATENT DOCUMENTS 5,032,001 A * 7/1991 Shang ................ G02B 6/03655
385/124
5,596,668 A * 1/1997 DiGiovanni ...... C03B 37/01205
385/123

(Continued)

FOREIGN PATENT DOCUMENTS

EP    1 500 959 A1    1/2005
EP    3 211 464 A1    8/2017

(Continued)

OTHER PUBLICATIONS

Gong Yandong et al., "Novel B/Ge codoped photosensitive fiber and dispersion compensation in an 8 x 10 Gbit/s DWDM system", Optics & Laser Technology, vol. 32, No. 1, Feb. 1, 2000, p. 23-p. 31.

*Primary Examiner* — Andrew Jordan
(74) *Attorney, Agent, or Firm* — Faegre Drinker Biddle & Reath LLP (57) ABSTRACT

The present embodiment relates to an MCF and the like suitable for fabricating an FBG with improved ripple characteristics. The MCF is mainly composed of silica glass, and comprises a plurality of light guiding structures and a common cladding. Each of the light guiding structures includes a core, a first cladding, and a second cladding. The refractive index of the second cladding is higher than that of the first cladding and is lower than those of the core and the common cladding. Further, at least a part of an inner cladding region, constituted by the first cladding and the second cladding, contains a photosensitive material having photosensitivity of changing a refractive index of a glass (Continued)

region containing the photosensitive material in response to irradiation of light with a specific wavelength.

13 Claims, 10 Drawing Sheets

(56) References Cited

U.S. PATENT DOCUMENTS

| | | | | |
|---|---|---|---|---|
| 5,867,618 | A * | 2/1999 | Ito | G02B 6/02114 385/37 |
| 5,883,990 | A * | 3/1999 | Sasaoka | G02B 6/021 372/102 |
| 6,067,392 | A * | 5/2000 | Wakami | G02B 6/0218 385/127 |
| 6,278,827 | B1 * | 8/2001 | Sugiyama | G02B 6/001 385/123 |
| 6,465,153 | B1 * | 10/2002 | Kewitsch | G02B 6/02114 430/290 |
| 6,597,849 | B2 * | 7/2003 | Ishikawa | C03C 13/04 385/127 |
| 6,728,458 | B2 * | 4/2004 | Taru | C03B 37/01413 385/123 |
| 6,738,183 | B2 * | 5/2004 | Shigehara | G02B 6/02138 359/337.2 |
| 6,804,437 | B2 * | 10/2004 | Murashima | G02B 6/03694 385/37 |
| 6,876,791 | B2 * | 4/2005 | Murashima | G02B 6/02085 385/37 |
| 6,882,777 | B2 * | 4/2005 | Shiozaki | G02B 6/02085 359/558 |
| 6,947,652 | B2 * | 9/2005 | Varner | G02B 6/03605 385/123 |
| 6,973,237 | B2 * | 12/2005 | Yamashita | G02B 6/02138 385/37 |
| 7,203,399 | B2 * | 4/2007 | Ishikawa | G02B 6/02085 385/123 |
| 7,532,797 | B2 * | 5/2009 | Hirano | G02B 6/02214 385/123 |
| 9,360,618 | B2 * | 6/2016 | Feder | G02B 6/02123 |
| 9,592,644 | B2 * | 3/2017 | Feder | B29D 11/00721 |
| 9,726,816 | B2 * | 8/2017 | Hayashi | G02B 6/02004 |
| 9,933,331 | B2 * | 4/2018 | Hayashi | G01M 11/33 |
| 10,031,284 | B2 * | 7/2018 | Hayashi | G02B 6/02004 |
| 10,139,559 | B2 * | 11/2018 | Hayashi | G02B 6/02004 |
| 10,156,693 | B2 * | 12/2018 | Benjamin | B29C 48/15 |
| 2001/0016105 | A1 * | 8/2001 | Sugiyama | G02B 6/001 385/133 |
| 2002/0025131 | A1 * | 2/2002 | Ishikawa | C03C 13/04 385/127 |
| 2002/0118939 | A1 * | 8/2002 | Taru | C03B 37/01413 385/127 |
| 2003/0165294 | A1 * | 9/2003 | Murashima | G02B 6/02138 385/37 |
| 2003/0231847 | A1 * | 12/2003 | Varner | G02B 6/03605 385/127 |
| 2004/0151467 | A1 * | 8/2004 | Ishikawa | G02B 6/02085 385/144 |
| 2004/0161196 | A1 * | 8/2004 | Murashima | G02B 6/02138 385/37 |
| 2004/0218859 | A1 * | 11/2004 | Yamashita | G02B 6/02138 385/37 |
| 2007/0201793 | A1 * | 8/2007 | Askins | G01B 11/18 385/37 |
| 2012/0230641 | A1 * | 9/2012 | Donlagic | G01D 5/3538 385/127 |
| 2014/0233890 | A1 * | 8/2014 | Feder | G02B 6/02123 385/37 |
| 2014/0270643 | A1 * | 9/2014 | Feder | B29D 11/00721 385/37 |
| 2016/0109650 | A1 * | 4/2016 | Nagashima | G02B 6/02114 385/127 |
| 2016/0209583 | A1 * | 7/2016 | Hayashi | G02B 6/02004 |
| 2016/0223774 | A1 * | 8/2016 | Bennett | B29C 48/15 |
| 2017/0023844 | A1 * | 1/2017 | Besida | G02F 1/353 |
| 2017/0115449 | A1 * | 4/2017 | Nagano | G02B 5/18 |
| 2017/0307812 | A1 * | 10/2017 | Hayashi | G02B 6/02004 |
| 2017/0307813 | A1 * | 10/2017 | Hayashi | G02B 6/02004 |
| 2017/0363508 | A1 * | 12/2017 | Hayashi | G01M 11/33 |
| 2018/0299612 | A1 * | 10/2018 | Yang | A61B 5/00 |
| 2019/0018185 | A1 * | 1/2019 | Hayashi | G02B 6/02004 |
| 2019/0041575 | A1 * | 2/2019 | Nagano | G02B 6/02042 |

FOREIGN PATENT DOCUMENTS

| | | |
|---|---|---|
| JP | H04-219705 A | 8/1992 |
| JP | 2000-39521 A | 2/2000 |
| JP | 2003-4926 A | 1/2003 |
| JP | 2014-194538 A | 10/2014 |
| JP | 2014-194544 A | 10/2014 |
| JP | 2015-206993 A | 11/2015 |
| TW | 200407573 | 5/2004 |
| WO | WO-03/093887 A1 | 11/2003 |
| WO | WO 03/107054 A1 | 12/2003 |
| WO | WO-2016/063800 A1 | 4/2016 |

* cited by examiner

MULTICORE OPTICAL FIBER WITH A CORE AND A COMMON CLADDING HAVING A HIGHER REFRACTIVE INDEX THAN THE CORE, FIBER BRAGG GRATING, AND METHOD FOR MANUFACTURING FIBER BRAGG GRATING

CROSS-REFERENCE TO RELATED APPLICATIONS

This application is a continuation application of PCT/JP2017/017033 claiming the benefit of priority of the Japanese Patent Application No. 2016-096097 filed on May 12, 2016, the entire contents of which are incorporated herein by reference.

TECHNICAL FIELD

The present invention relates to a multicore optical fiber, a fiber Bragg grating, and a method for manufacturing a fiber Bragg grating.

BACKGROUND ART

In a long-haul optical fiber communication system for transmitting signal light of C band or L band, an optical fiber amplifier to which a rare earth-element such as erbium (Er) is doped is used as an optical amplifier that amplifies the signal light. A gain spectrum of an amplifier (Erbium-doped fiber amplifier, hereinafter referred to as "EDFA") containing an optical fiber doped with erbium (Erbium-doped fiber, hereinafter referred to as "EDF") as an optical amplifying medium has a peak in the wavelength of 1.53 μm band. The bit error rate increases and the performance of the transmission system deteriorates due to non-flatness of this gain spectrum. As a component for avoiding such performance deterioration, a fiber Bragg grating (hereinafter referred to as "FBG") that is a gain flattening device, in particular, a slanted fiber grating (hereinafter referred to as "SFC") have been developed.

Meanwhile, in recent years, as a technique of greatly increasing the transmission capacity per optical fiber, a long-haul optical fiber communication system has been proposed. The long-haul optical fiber communication system performs spatial multiplexing signal light transmission, using a multicore optical fiber (hereinafter referred to as "MCF") constituted by a plurality of light guiding structures each including a core and a single common cladding surrounding the plurality of light guiding structures, as an optical transmission line. From this, the importance of multicore EDF (MC-EDF) and multicore SFG (MC-SFG) is increasing.

Technologies of manufacturing a gain flattening device and the like using a single-core optical fiber are described in Patent Documents 1 and 2. An optical fiber including a core or a cladding comprised of silica glass in which a photosensitive material (for example, $GeO_2$ or $B_2O_3$) is doped is irradiated with ultraviolet light with spatially modulated intensity in an axial direction of the core, whereby a grating having refractive index distribution according to intensity distribution of the ultraviolet light in the axial direction of the core can be written. As the ultraviolet light, a second harmonic wave of argon ion laser light (244 nm), KrF excimer laser light (248 nm), a fourth harmonic wave of YAG laser light (265 nm), a second harmonic wave of copper vapor laser light (255 nm), or the like is applicable.

As a method for irradiating an optical fiber with ultraviolet light with spatially modulated intensity along the axial direction of the core, there are a phase mask method for causing ±1 order diffracted light generated using a chirped grating phase mask to interfere with each other, a method for directly exposing the optical fiber with the laser light, and a two-light flux interference exposure method for causing two of causing two branched light beams to interfere with each other after branching laser light into two. Among the aforementioned methods, the phase mask method can more easily manufacture the grating with more favorable reproducibility than other methods.

A technology for manufacturing an MC-SFG is described in Patent Document 3. In the manufacturing technique described in Patent Document 3, a plurality of light guiding structures of an MCF is simultaneously irradiated with ultraviolet light with spatially modulated intensity after the surroundings of the MCF are filled with matching oil, whereby gratings are simultaneously formed in the plurality of light guiding structures. The reason why the surroundings of the MCF are filled with the matching oil is to compensate for the condensing effect due to the fact that the MCF has a cylindrical shape. In this manufacturing technology, since the gratings are simultaneously formed in the plurality of light guiding structures of an MCF, the manufacturing time can be reduced. In addition, uniformity of characteristics of the gratings respectively formed in the plurality of light guiding structures is expected.

CITATION LIST

Patent Literature

Patent Document 1: Japanese Patent Application Laid-Open No. 2003-4926
Patent Document 2: International Publication No.
Patent Document 3: Japanese Patent Application Laid-Open No. 2014-194538
Patent Document 4: Japanese Patent Application Laid-Open No. 2015-206993

SUMMARY OF INVENTION

Technical Problem

As a result of examining the conventional FBGs, the inventor has found the following problems. First, according to the findings of the inventor, the technology for simultaneously irradiating a plurality of light guiding structures of the MCF with ultraviolet light to simultaneously form gratings has a problem that the ripple width of the transmission spectrum of the grating formed in each of the light guiding structures may become large in some cases. Note that the ripple refers to a component of pulsation superimposed on a grating forming loss with respect to the wavelength. The ripple width refers to a difference between a maximum value and a minimum value of the pulsation component in the range of the wavelength of ±2 nm after smoothing processing is performed by taking a moving average in the range of the wavelength of ±0.6 nm for each wavelength of 0.2 nm.

The optical loss in the SFG is obtained when core mode light is coupled to a cladding mode by the slanted grating. By increasing the refractive index of a resin region covering a glass region, the light (cladding mode light) coupled to the cladding mode is emitted from the glass region to the resin region. However, part of the cladding mode light propagates in a direction opposite to the propagation direction of the original core mode light by Fresnel reflection due to the difference in refractive index between the glass region and the resin region.

In the MC-SFG, since the gratings are respectively formed in the plurality of light guiding structures, there is a great opportunity that the cladding mode light generated in a certain grating is recombined into the core mode light in another grating. The propagation direction of the core mode light after this recombination is the same as the propagation direction of the original core mode light. The ripple width may become large due to the interference between the core mode light after recombination and the original core mode light. In particular, in the case of long-haul transmission such as submarine cable transmission, since a large number of optical amplifiers is provided in series, the ripple characteristics of an MC-SFG used as a gain flattening filter (GFF) become a big problem.

The present invention has been made to solve the above problem, and an objective is to provide a favorable MCF for fabricating an FBG with improved ripple characteristics. Another objective is to provide an FBG using such an MCF and a method of manufacturing the FBG Solution to Problem A multicore optical fiber (MCF) according to the present embodiment is comprised of silica glass as a main component and comprised: a plurality of light guiding structures each extending along a central axis, and a single common cladding surrounding the plurality of light guiding structures. Each of the plurality of light guiding structures includes: a core extending along the central axis; a first cladding provided on an outer periphery of the core, the first cladding having a refractive index lower than a refractive index of the core; and a second cladding provided on an outer periphery of the first cladding, the second cladding having a refractive index higher than the refractive index of the first cladding, lower than the refractive index of the core, and lower than an refractive index of the common cladding. Further, the MCF contains a photosensitive material in at least a part (photosensitive region) of an inner cladding region constituted by the first cladding and the second cladding, the photosensitive material having photosensitivity of changing a refractive index of a doped glass containing the photosensitive material region in response to irradiation of light having a specific wavelength.

Advantageous Effects of Invention

According to the present embodiment, fiber Bragg gratings (among them, MC-SFG) with improved ripple characteristics can be easily fabricated.

DESCRIPTION OF EMBODIMENTS

Description of Embodiment of Present Invention

First, content of an embodiment of the present invention will be individually listed and described.

(1) As one aspect, a multicore optical fiber (MCF) according to the present embodiment is comprised of silica glass as a main component and comprises: a plurality of light guiding structures each extending along a central axis (a fiber axis extending along a longitudinal direction of the MCF); and a single common cladding surrounding the plurality of light guiding structures. Each of the plurality of light guiding structures includes: a core extending along the central axis; a first cladding provided on an outer periphery of the core, the first cladding having a refractive index lower than a refractive index of the core; and a second cladding provided on an outer periphery of the first cladding, the second cladding having a refractive index higher than the refractive index of the first cladding, lower than the refractive index of the core, and lower than an refractive index of the common cladding. Further, the MCF includes a photosensitive material in at least a part (photosensitive region) of an inner cladding region constituted by the first cladding and the second cladding, the photosensitive material having photosensitivity of changing a refractive index of a glass region doped with the photosensitive material in response to irradiation of light having a specific wavelength. Note that the photosensitive region including a photosensitive material may be any of a part or the whole of only the first cladding, a part or the whole of only the second cladding, a part of both the first and second claddings, a part of the first cladding and the whole of the second cladding, and the whole of the first cladding and a part of the second cladding.

(2) As one aspect of the present embodiment, a dopant for removing an unnecessary component of the light having a specific wavelength is favorably contained in the common cladding except the plurality of light guiding structures.

(3) As one aspect of the present embodiment, a first absorption region including, in a cross section of the MCF, the cross section being orthogonal to the central axis, a center of the cross section, and including an absorbing material that absorbs the light having a specific wavelength as the dopant is favorably provided in the common cladding. Further, as one aspect of the present embodiment, absorbance at a wavelength of 244 nm in the first absorption region is favorably 0.1 or more and 4 or less.

(4) As one aspect of the present embodiment, the first absorption region may include a fluorescent material that absorbs light having a specific wavelength and emits fluorescence as the dopant. In this case, a percentage of the amount of light to be converted into the fluorescence, of the light having a specific wavelength, in the first absorption region is favorably 50% or more and 100% or less. Further, as one aspect of the present embodiment, a diameter of the first absorption region is favorably 5 μm or more and 100 μm or less.

(5) As one aspect of the present embodiment, a second absorption region including an absorbing material that absorbs the light having a specific wavelength as the dopant may be provided in the common cladding.

(6) As one aspect of the present embodiment, the dopant that can function as the absorbing material or the fluorescent material is favorably metal atoms or semiconductor atoms. As one aspect of the present embodiment, the dopant may be Ge. Further, as one aspect of the present embodiment, a doping amount of the dopant is favorably 0.1 wt % or more.

(7) As one aspect, a fiber Bragg grating (FBG) according to the present embodiment includes an MCF having the above-described structure (the MCF according to the present embodiment), and a grating provided by spatial refractive index modulation in each of the plurality of light guiding structures of the MCF.

(8) As one aspect, a method for manufacturing an FBG according to the present embodiment is configured by arrangement of a condensing lens and a diffraction grating, arrangement of the MCF having the above-described structure (the MCF according to the present embodiment), and write of a grating. The condensing lens has a focal length of 300 to 1600 mm, and the condensing lens and the diffraction grating are arranged on a propagation path of ultraviolet light to be irradiated. The prepared MCF is arranged such that a distance (gap) between a central axis of the MCF and a light emission surface of the diffraction grating becomes 250 μm or less. In such an installation state, the diffraction grating is irradiated with the ultraviolet light via the condensing lens. When the ultraviolet light passes through the diffraction grating, a periodic interference fringe is formed, and any one of the plurality of light guiding structures of the MCF is irradiated with the periodic interference fringe, whereby a grating is formed in the light guiding structure irradiated with the interference fringe. Through the above steps, the FBG according to the present embodiment is obtained.

(9) As one aspect of the present embodiment, irradiating each of the plurality of light guiding structures with the interference fringe is favorably performed while rotating the MCF around the central axis.

Each of the aspects listed in the [Description of Embodiment of Present Invention] can be applied to each of the remaining aspects or to all combinations of the remaining aspects.

Details of Embodiment of Present Invention

Hereinafter, specific structures of an MCF, an FBG and a method for manufacturing an FBG according to the present embodiment will be described in detail with reference to the attached drawings. Note that the present invention is not limited to these illustrative examples and is indicated by the scope of the claims, and it is intended to include all changes within the meaning and the scope equivalent to the claims. Further, in the description of the drawings, the same element is denoted by the same reference sign, and redundant description is omitted.

Figure 1:
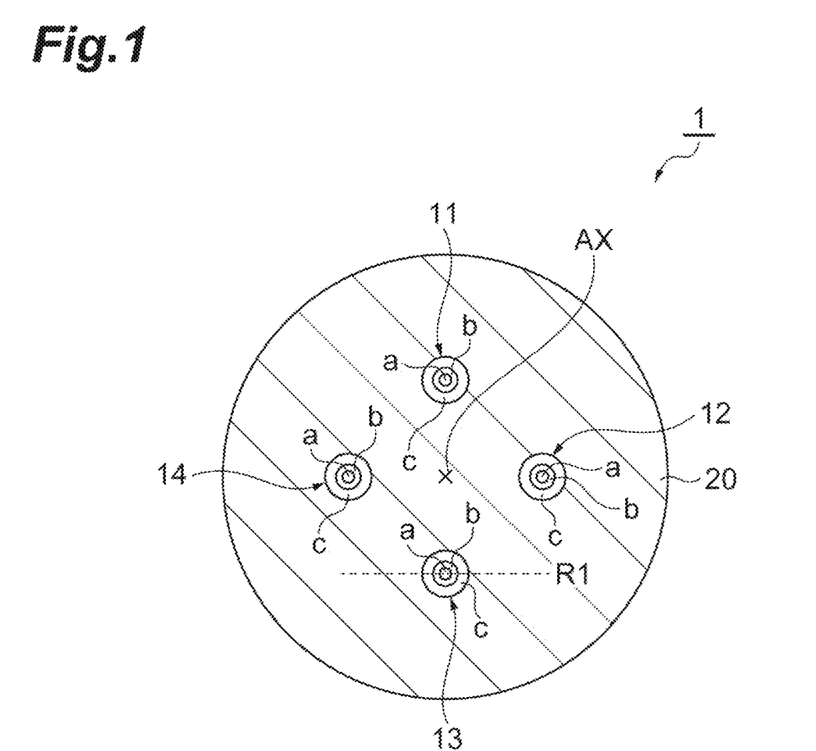
FIG. 1 is a view illustrating a cross-sectional structure of an MCF 1.

FIG. 1 is a view illustrating a cross-sectional structure of a multicore optical fiber (MCF) 1. The MCF 1 contains silica glass as a main component, and includes a plurality of (four in FIG. 1) light guiding structures 11 to 14 and a single common cladding 20. In the cross section of the fiber, the outer shape of the common cladding 20 is a circular shape centered on a central axis (a fiber axis extending along a longitudinal direction of the MCF 1) AX, and the light guiding structures 11 to 14 are arranged at equal intervals on a circumference of the circle centered on the central axis AX. The light guiding structures 11 to 14 may have the same structure. In the example of FIG. 1, each of the light guiding structures 11 to 14 is constituted by a core a extending along the central axis AX, a first cladding b provided on an outer periphery of the core a, and a second cladding c provided on an outer periphery of the first cladding b.

Figure 2:
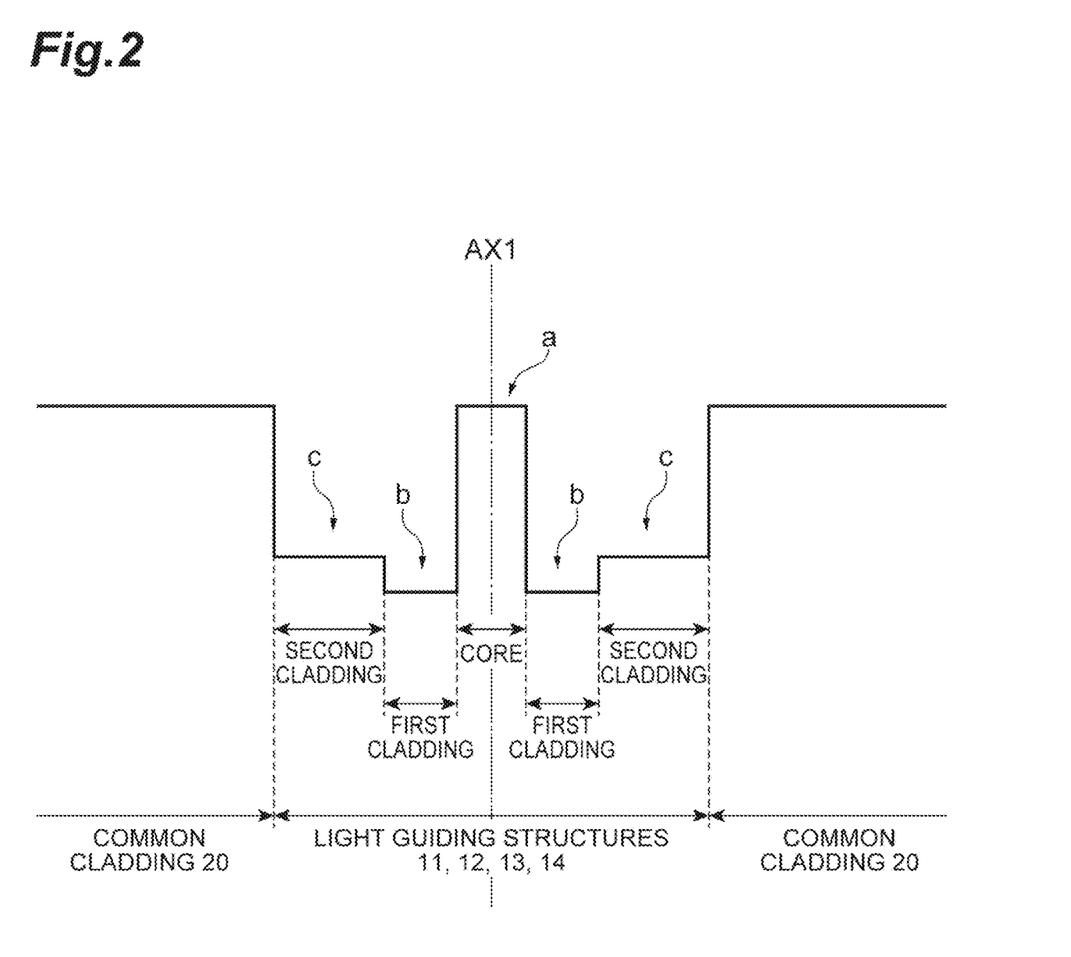
FIG. 2 is a refractive index profile of light guiding structures of the MCF 1.

FIG. 2 is a refractive index profile of each of the light guiding structures 11 to 14 of the MCF 1. This refractive index profile illustrates distribution of the refractive index at positions on a line R1 (the broken line in FIG. 1) passing through a center position (position coincident with the central axis AX1) of each of the light guiding structures 11 to 14 in the cross section illustrated in FIG. 1. Note that, in FIG. 2, AX1 is a central axis of each of the light guiding structures 11 to 14 parallel to the central axis AX (fiber axis) of the MCF 1.

The refractive index of the second cladding c is higher than the refractive index of the first cladding b, and is lower than the refractive index of the core a and the refractive index of the common cladding. Note that the refractive index of the second cladding c may be nearly equal to the refractive index of the first cladding b. The refractive index of the common cladding may be nearly equal to the refractive index of the core a or may be higher than the refractive index of the core a.

A photosensitive region in which a photosensitive material is doped is provided in at least a part of an inner cladding region constituted by the first cladding b and the second cladding c. Therefore, the photosensitive region including the photosensitive material may be any of a part or the whole of only the first cladding b, a part or the whole of only the second cladding c, a part of both the first cladding b and the second cladding c, a part of the first cladding and the whole of the second cladding, and the whole of the first cladding and the second cladding. The photosensitive material has a photosensitivity that changes the refractive index of a glass region doped with the photosensitive material in response to irradiation of light having a specific wavelength (ultraviolet light), and is, for example, $GeO_2$, $B_2O_3$, or the like. In each of the light guiding structures 11 to 14 of the MCF 1, an MC-SFG is obtained by forming a grating in the region doped with the photosensitive material.

In the MC-SFG fabricated from the MCF 1, the refractive index of the second cladding c is lower than the refractive index of the common cladding, and thus cladding mode light emitted from the grating of each of the light guiding structures to the common cladding 20 is not recombined with core mode light in its own grating or in another grating. By use of the MCF 1, the MC-SFG with improved ripple characteristics can be fabricated.

Figure 3:
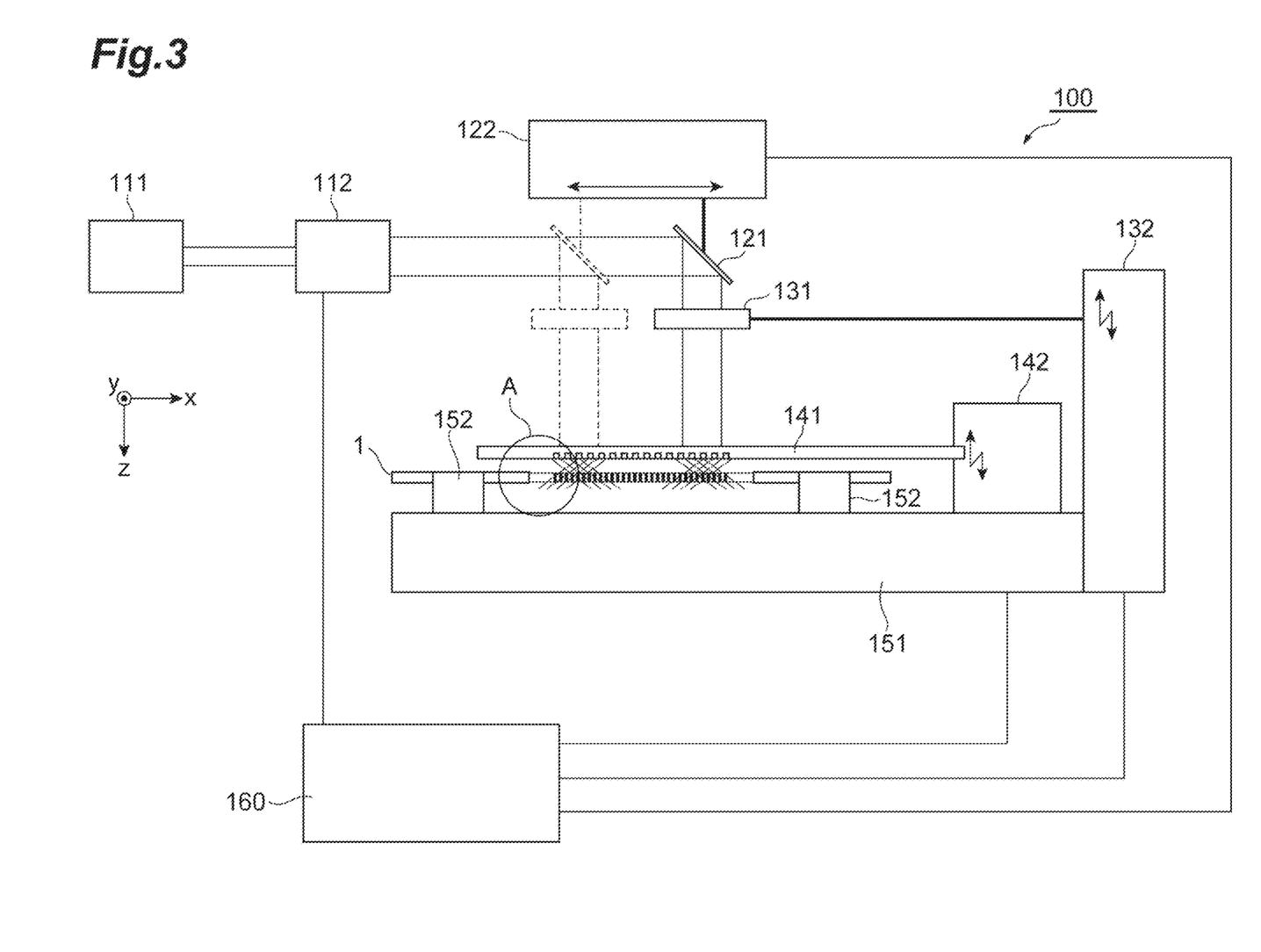
FIG. 3 is a diagram illustrating a configuration of a grating manufacturing device 100.

FIG. 3 is a diagram illustrating a configuration of a grating manufacturing device 100. The grating manufacturing device 100 is a device for forming a grating (fabricating the MC-SFG) in the photosensitive region (the region in which the photosensitive material is doped) of each of the light guiding structures 11 to 14 of the MCF 1. In FIG. 3, an xyz orthogonal coordinate system is illustrated for convenience of description. An x-axis is an axis parallel to the central axis AX of the MCF 1. A z-axis is an axis parallel to a laser light irradiation direction to the MCF 1. A y-axis is an axis perpendicular to both the x-axis and the z-axis.

The grating manufacturing device 100 includes a laser light source 111, a beam diameter adjusting unit 112, a scanning mirror 121, a scanning mirror position adjusting unit 122, a cylindrical lens 131, a cylindrical lens position adjusting unit 132, a phase mask 141, a phase mask position adjusting unit 142, a stage 151, a fixing jig 152, and a synchronization control unit 160.

The laser light source 111 outputs ultraviolet laser light having a wavelength (for example, 244 nm band) that can change the refractive index of the photosensitive region in the MCF 1. The beam diameter adjusting unit 112 adjusts a beam diameter and a wavefront of the laser light output from the laser light source 111, and outputs adjusted laser light.

The scanning mirror 121 is movable in a direction (x direction) along the central axis AX of the MCF 1, and deflects the laser light output from the beam diameter adjusting unit 112 in a z direction toward the MCF 1. The scanning mirror position adjusting unit 122 adjusts the position of the scanning mirror 121 to adjust a grating writing position in the MCF 1.

The cylindrical lens 131 functions as a condensing lens that receives input of the laser light deflected by the scanning mirror 121 and converges the laser light. The cylindrical lens position adjusting unit 132 adjusts the interval between the cylindrical lens 131 and the MCF 1. Note that the focal length of the cylindrical lens 131 is favorably 300 to 1600 mm.

The phase mask 141 is arranged between the cylindrical lens 131 and the MCF 1. In the phase mask 141, a concavo-convex grating (diffraction grating) with a period of wavelength order is formed in a surface (light emission surface) facing the MCF 1. The phase mask 141 receives input of the laser light output from the cylindrical lens 131, and generates ±1 order diffracted light. The ±1 order diffracted light interferes in the photosensitive region of the MCF 1 and forms light intensity distribution. As a result, a grating is formed in the photosensitive region of the MCF 1. The phase mask position adjusting unit 142 adjusts the position of the phase mask 141 (the position of the light emission surface with respect to the MCF 1) to adjust an interval (gap) between the phase mask 141 and the MCF 1. Note that the gap is favorably 250 μm or less.

The MCF 1 is fixed on the stage 151 by the fixing jig 152. The MCF 1 is freely rotatable about the central axis AX and is freely movable in the direction (x direction) of the central axis AX coincident with the fiber axis on the stage 151. Note that the fixing jig 152 may rotate the MCF 1 around the central axis AX.

The synchronization control unit 160 controls position adjustment of the scanning mirror 121 by the scanning mirror position adjusting unit 122 and position adjustment of the phase mask 141 by the phase mask position adjusting unit 142 in association with each other. It is further favorable that the synchronization control unit 160 controls beam diameter adjustment of the laser light by the beam diameter adjusting unit 112 in association with the aforementioned adjustment control, and it is further favorable that the synchronization control unit 160 controls position adjustment of the cylindrical lens 131 by the cylindrical lens position adjusting unit 132 in association with the aforementioned adjustment control.

Favorably, details are as follows. The focal length of the cylindrical lens 131 is 300 to 1600 mm. The radius of curvature of the wavefront of the laser light radiated to the phase mask 141 is 20 mm or more. The scanning mirror 121 is moved in an axial direction of the MCF 1 while varying the beam width of the laser light radiated to the phase mask 141 from 500 to 3000 μm. The beam width of the laser light entering the cylindrical lens 131 is 500 to 3000 μm. Further, each of the scanning mirror position adjusting unit 122, the cylindrical lens position adjusting unit 132, and the phase mask position adjusting unit 142 includes a linear motor, a stepping motor, a piezoelectric element, and the like.

Figure 4:
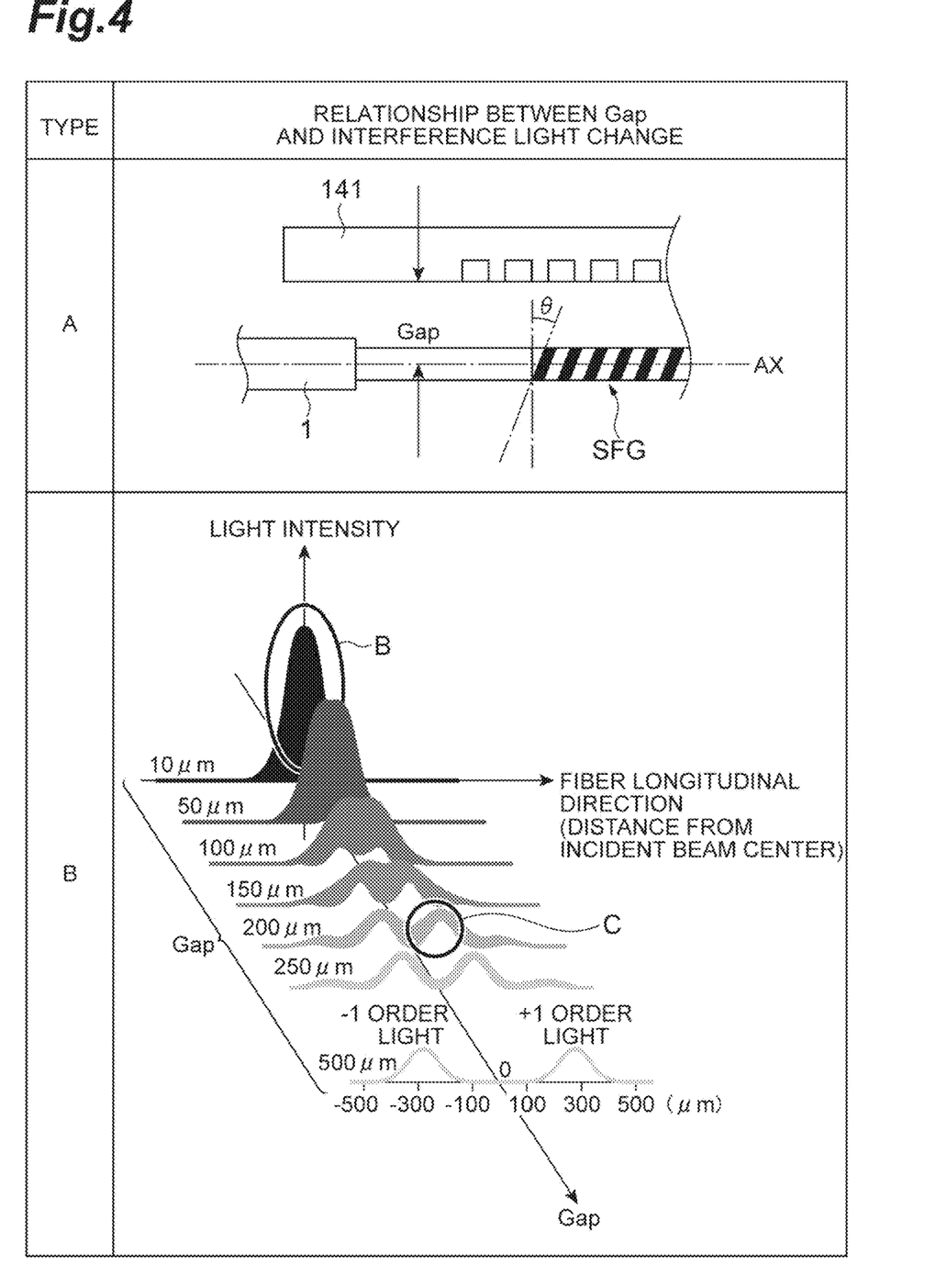
FIG. 4 is a diagram for describing a relationship between a gap and interference light change.
Figure 5:
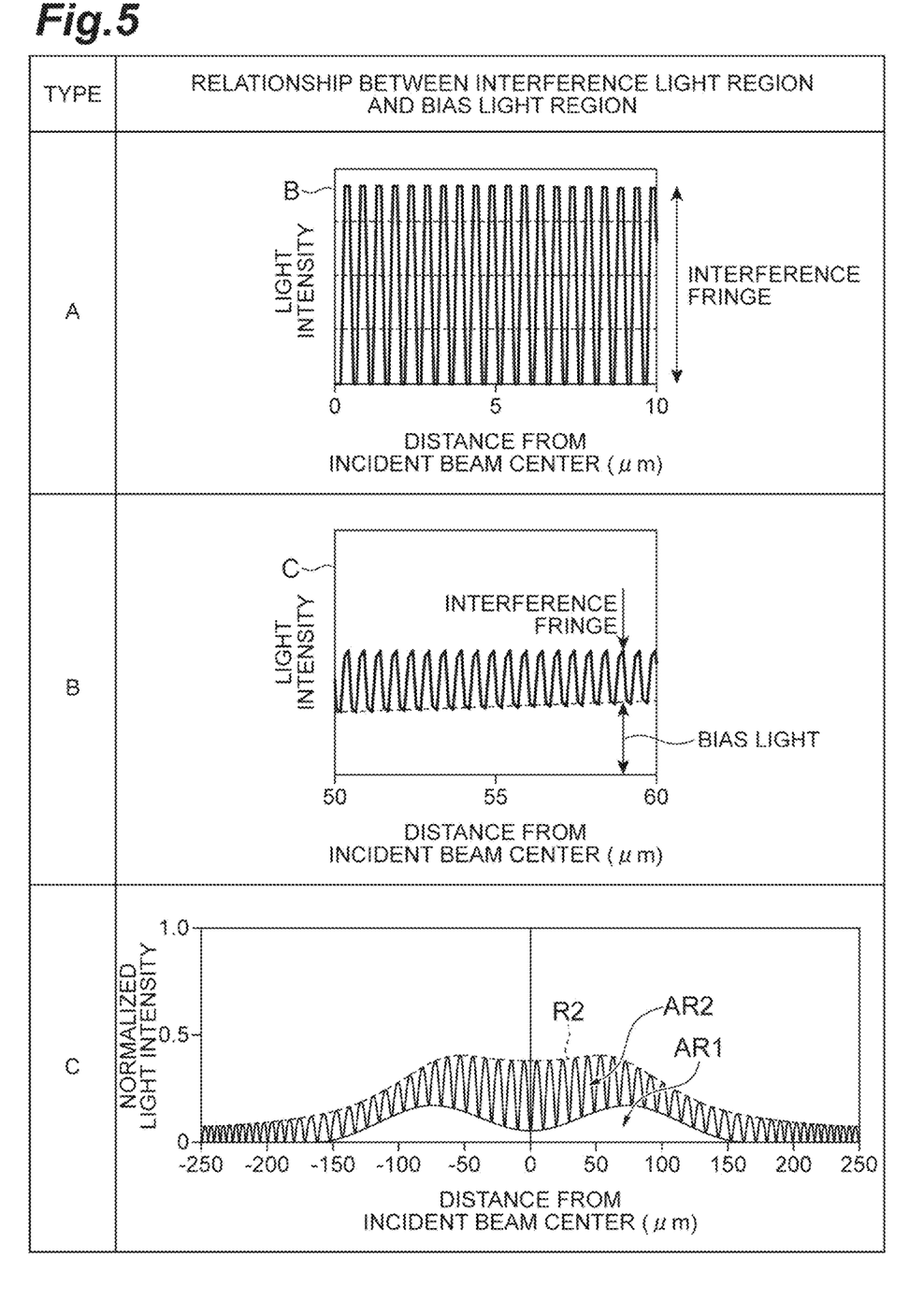
FIG. 5 is a graph for describing states of an interference light region and a bias light region in a stage before a far-field pattern at a gap=150 μm grows into ±1 order diffracted light.
Figure 6:
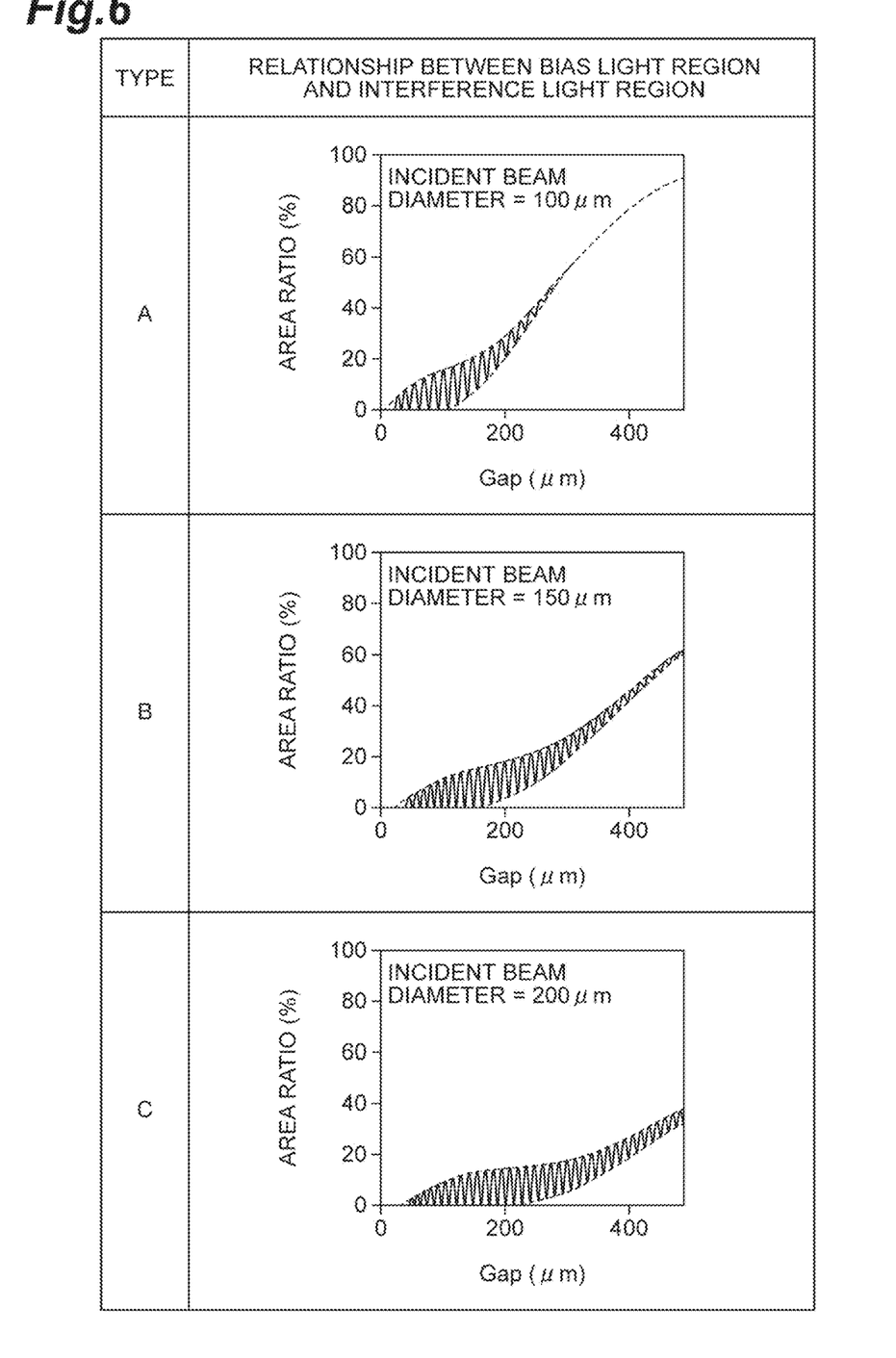
FIG. 6 is a graph illustrating a relationship between the bias light region and the interference light region.

Next, a method of manufacturing an MC-SFG will be described in detail with reference to FIGS. 4 to 6. Note that FIG. 4 is a diagram for describing a relationship between a gap and interference light change. FIG. 5 is a graph for describing states of an interference light region and a bias light region in a stage before a far-field pattern at a gap=150 μm grows into the ±1 order diffracted light. Further, FIG. 6 is a graph illustrating a relationship between the bias light region and the interference light region.

This manufacturing method uses the grating manufacturing device 100 in FIG. 3 in order to write a grating in each photosensitive region in the light guiding structures 11 to 14 of the MCF 1. In the grating manufacturing device 100, selective writing of the grating becomes possible by position adjustment of the phase mask 141 (including the diffraction grating constituting the periodic concavo-convex grating), the cylindrical lens 131, and the like. Note that Type A in FIG. 4 is an enlarged view of the region A in FIG. 3, and the grating to be written in the MCF 1 is written at an angle θ that is larger than 0 degrees and smaller than 10 degrees with respect to the cross section (surface orthogonal to the central axis AIX).

Note that, in the grating manufacturing device 100 in FIG. 3, the MCF 1 is irradiated with the laser light (ultraviolet light) via the cylindrical lens 131 and the phase mask 141. An important parameter is the distance (gap) between the phase mask 141 and the MCF 1. Specifically, as illustrated in Type A in FIG. 4, the "gap" is defined by a distance between the light emission surface (the light emission surface of the diffraction grating) of the phase mask 141 from which the diffracted light is emitted, and the central axis AX of the MCF 1. Type B in FIG. 4 is a graph illustrating an example of a calculation result of behavior of interference light with respect to the gap. As can be seen from Type B in FIG. 4, the smaller the gap, the higher the clarity (intensity of light intensity) of an interference fringe generated by the diffraction grating, and the light intensity ratio of brightness and darkness of an interference fringe (bright: $I_t$, dark: $I_n$) is $I_t/I_n=\infty$. On the other hand, the larger the gap, the smaller the clarity. In both cases, the far field pattern far from the diffraction grating is the ±1 order diffracted light of $I_t/I_n\approx 0$. A larger $I_t/I_n$ is advantageous for grating writing. That is, a smaller gap can form a loss as designed. Note that Type A in FIG. 5 is a graph illustrating a relationship between the interference light region (interference fringe) and the bias light region in the region B illustrated in Type B in FIG. 4. Further, Type B in FIG. 5 is a graph illustrating a relationship between the interference light region (interference fringe) and the bias light region in the region C illustrated in Type B in FIG. 4. From these graphs as well, it is found that the ratio of the bias light increases as the gap increases. Note that the "bias light" is a light component superimposed on the interference fringe in a state where the interference fringe is collapsed as illustrated in Type B in FIG. 5, and has an extremely small degree of contribution to writing of the grating.

Note that Type C in FIG. 5 is a calculation example (graph) of a case of the gap=150 μm in which the interference light region and the bias light region coexist at a stage before the far field pattern grows into ±1 order diffracted light. The wavelength of the incident laser light is 244 nm. Further, Type C in FIG. 5 illustrates a relationship between a distance from a center position of an incident beam and normalized light intensity at each position. AR1 is the bias light region, AR2 is the interference light region, and the broken line R2 is an envelope curve of the interference light region AR2. Relationships between the gap and a ratio of the area of the interference light region (the interference fringe area partitioned by the envelope curves) and the bias light area (region) are illustrated in Types A to C in FIG. 6. The incident beam diameter of the incident beam on the diffracted light is 100 μm for Type A, 150 μm for Type B, and 200 μm for Type C. The graphs of Types A to C illustrate the relationships between the gap and the area ratio the area of the bias light region AR1/(the area of the bias light region AR1+the area of the interference light region AR2)) with respect to the incident beam with the beam diameter of 100 μm. Further, the broken lines in each graph are envelope curves respectively indicating an upper limit and a lower limit of the graph. The gap corresponds to a diameter direction of the cross section of the MCF 1. In any of Types A to C, it is found that the area ratio increases and the area of the interference light region AR2 (the interference fringe area) decreases with the increase in the gap. Increasing the incident beam diameter reduces the slope of the graph. In writing to the MCF 1, a larger slope of the graph illustrating the area ratio with respect to the gap is advantageous, as in Type A. That is, the larger the slope of the graph, the more contrast can be given between easiness and difficulty in writing within a short distance. In this case, even if a plurality of light guiding structures (in particular, photosensitive regions) are present on an optical axis of the incident beam, the interference fringe becomes dominant in the light guiding structure close to the diffraction grating, and the grating is preferentially written. On the other hand, light hard to write the grating is dominant in a far light guiding structure, and writing of the grating becomes difficult. Therefore, as can be seen from Types A to C in FIG. 6 where the incident beam diameter is set to 100 μm, the gap is particularly effective at 250 μm or less in order to make the slope of the graph sharp.

Here, the relationship among the wavelength λ of the incident beam (writing wavelength of the grating), the focal length f of the condensing lens (cylindrical lens 131), the diameter D of the beam to enter the condensing lens, and a condensing spot diameter, that is, the diameter $D_0$ of the beam to enter the diffraction grating (phase mask 141) is expressed by the following expression (1). That is, a value obtained by dividing 4λS by πD is $D_0$.

$$D_0 = 4\lambda f/(\pi D) \quad (1)$$

For example, in the case where laser light having the writing wavelength λ of 244 nm and the beam diameter D of 1 mm enters the condensing lens, a focal length $f_{100\mu m}$ of the condensing lens becomes 323 mm from the expression (1) in order to make the diameter of the incident beam on the diffraction grating be 100 μm. Similarly, to make the diameter of the incident beam on the diffraction grating be 150 μm, the focal length $f_{150\mu m}$ of the condensing lens is 485 mm. Further, to make the diameter of the incident beam on the diffraction grating be 200 μm, the focal length $f_{200\mu m}$ of the condensing lens is 645 mm. That is, it is effective to make the focal length f of the condensing lens small at the stage before the laser light enters the diffraction grating.

As a matter of course, $D_0$ is adjusted by the grating writing wavelength λ and the diameter D of the beam to enter the condensing lens. It is effective that the incident beam diameter D is in the range of 1 to 5 mm, and the grating writing wavelength λ is in the range of 244 to 265 nm. To such laser light for grating writing, a second harmonic wave of argon ion laser light (244 nm), KrF excimer laser light (248 nm), a second harmonic wave of copper vapor laser light (255 nm), a fourth harmonic wave of YAG laser light (265 nm), and the like is applicable.

Specifically, from the above expression (1), it is effective that the focal length f of the condensing lens with respect to the incident beam having the wavelength λ of 244 nm is 323 to 1615 mm. Further, it is effective that the focal length f of the condensing lens with respect to the incident beam having the wavelength λ of 265 nm is 297 to 1485 mm.

Figure 7:
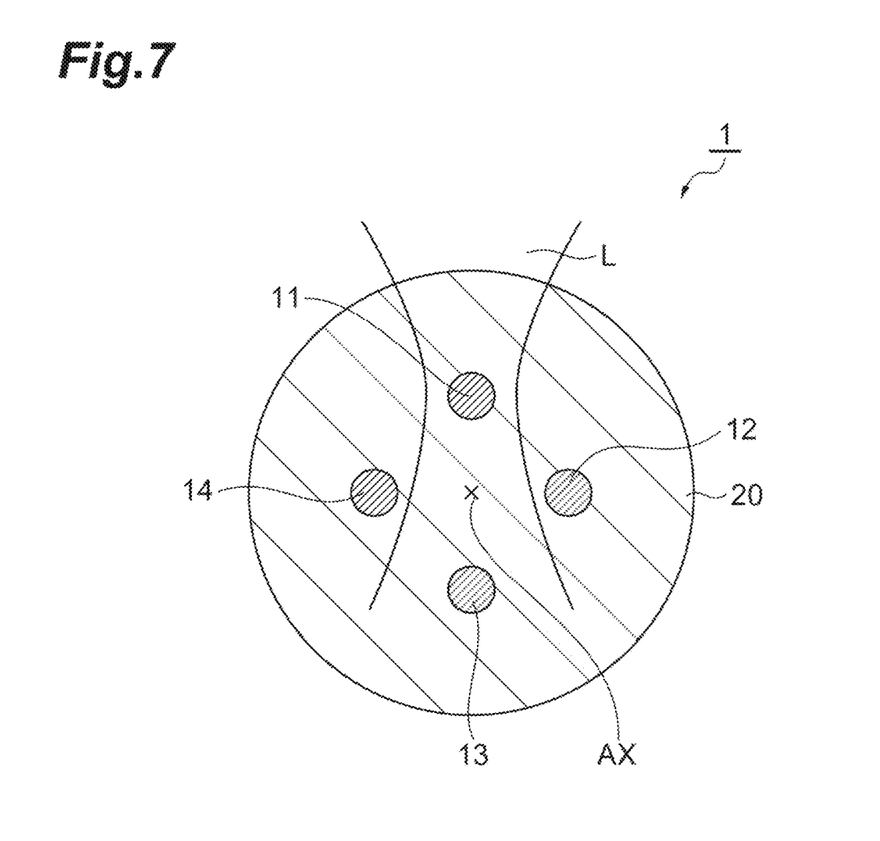
FIG. 7 is a view for describing irradiation with ultraviolet light on a cross section of the MCF 1.

FIG. 7 is a view for describing irradiation with ultraviolet light on a cross section of the MCF 1. The ±1 order diffracted light L of the ultraviolet laser light generated in the phase mask 141 after converged by the cylindrical lens 131 is condensed at the position of the light guiding structure 11, of the light guiding structures 11 to 14 of the MCF 1, whereby the grating can be effectively formed in the photosensitive region of the light guiding structure 11. The grating can be sequentially formed in the respective photosensitive regions of the light guiding structures 11 to 14 of the MCF 1 by rotating the MCF 1 around the central axis AX (fiber axis) by 90 degrees at a time, whereby the MC-SFG can be obtained.

When the ±1 order diffracted light L of the ultraviolet laser light is condensed at the position of the light guiding structure 11 and the grating is formed in the light guiding structure 11, the grating is slightly formed in the photosensitive region of another light guiding structure 13. To avoid such situation, an MCF having a cross-sectional structure as illustrated in Type A in FIG. 8 may be used.

Figure 8:
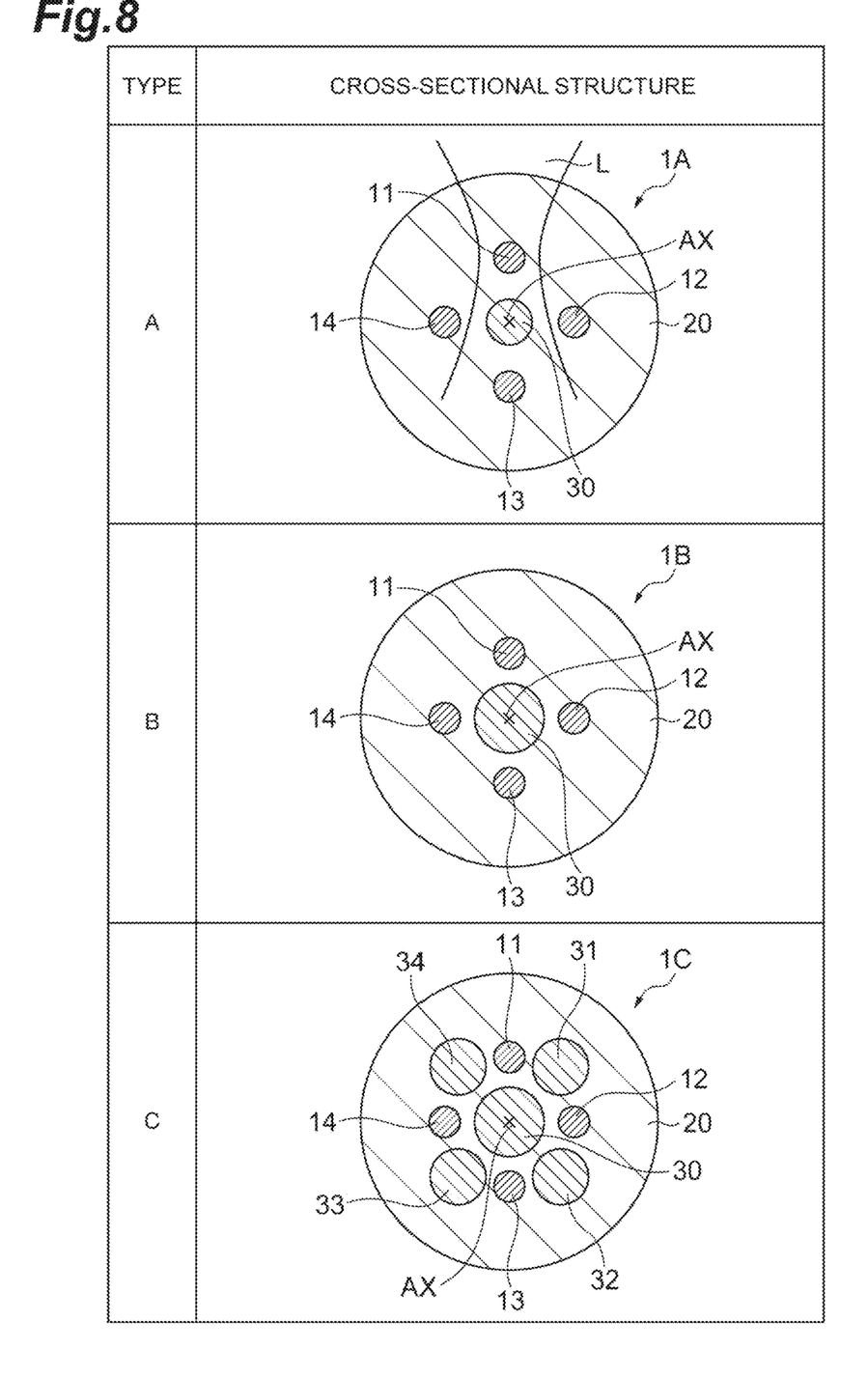
FIG. 8 is a view illustrating cross-sectional structures of various types of MCFs.

Type A in FIG. 8 is a view illustrating a cross-sectional structure of an MCF 1A. Comparing the cross-sectional structures of the MCF 1 illustrated in FIGS. 1 and 7, the MCF 1A of Type A is different in including a first absorption region 30.

The first absorption region 30 is a region including a cross-sectional center coincident with the central axis AX of the common cladding 20 in the cross section (a surface orthogonal to the central axis AX) of the MCF 1A. The first absorption region 30 is a region containing a dopant (absorbing material) that absorbs light having a specific wavelength (ultraviolet light) that can change the refractive indexes of the photosensitive regions of the light guiding structures 11 to 14. The first absorption region 30 may be a region containing a dopant (fluorescent material) that absorbs excitation light, which is the light having a specific wavelength, and emits fluorescence.

Absorbance at the wavelength of 244 nm in the first absorption region 30 is favorably 0.1 or more and 4 or less. In the case where the first absorption region 30 includes the fluorescent material, a percentage of the amount of light to be converted into the fluorescence, of the light having a specific wavelength, in the first absorption region 30 is favorably 50% or more and 100% or less. The diameter of the first absorption region 30 is favorably 5 μm or more and 100 μm or less.

The dopant is favorably metal atoms or semiconductor atoms. As the absorbing material, Ge, $TeO_2$, ZnO, Er, Yb, or MgO is used, for example. As the fluorescent material, Ge, B, Cu, Fe, Ce, or Sn is used, for example. The doping amount of the dopant is favorably 0.1 wt % or more.

In the case of fabricating the MC-SFG using the MCF 1A, the order diffracted light L of the ultraviolet laser light is condensed at the position of the light guiding structure 11, whereby the grating is formed in the photosensitive region in the light guiding structure 11. At this time, since the ultraviolet laser light having passed through the light guiding structure 11 is absorbed in the first absorption region 30, entering of light to the light guiding structure 13 is suppressed. Therefore, grating formation in the photosensitive region of the light guiding structure 13 is suppressed. In the case where the dopant in the first absorption region 30 is the fluorescent material, fluorescence is generated in the first absorption region 30. However, since the photosensitive material has no photosensitivity to the fluorescence, there is no change in the refractive index of the photosensitive region due to fluorescence.

In the case where the dopant in the first absorption region 30 is the fluorescent material, the fluorescence intensity during grating formation may be detected by a photodetector. In this case, the state of irradiation of the MCF 1A with the ±1 order diffracted light L of the ultraviolet laser light can be grasped. Therefore, check and adjustment of an alignment state of an irradiation optical system can be performed.

The type B illustrated in FIG. 8 is a view illustrating a cross-sectional structure of the MCF 1B. Comparing the cross-sectional structure of the MCF 1B of Type B with the cross-sectional structure of the MCF 1A of Type A, the MCF 1B of Type B is different in a large diameter of the first absorption region 30.

When attempting to shorten the time required for grating formation, increasing power of the ultraviolet laser light to be radiated to the MCF is conceivable. However, the power of the ultraviolet laser light having transmitted through the first absorption region 30 from the light guiding structure 11 and radiated to the light guiding structure 13 becomes large, and the grating is formed in the photosensitive region of the light guiding structure 13. In such a case, the power of the ultraviolet laser light transmitted through the first absorption region 30 and radiated to the light guiding structure 13 can be made small by increasing the diameter of the first absorption region 30 and increasing the concentration of the dopant (the absorbing material or the fluorescent material) in the first absorption region 30, as in the MCF 1B.

The type C illustrated in FIG. 8 is a view illustrating a cross-sectional structure of the MCF 1C. Comparing the cross-sectional structure of the MCF 1C of Type C with the cross-sectional structure of the MCF 1B of Type B, the MCF 1C of Type C is different in further including second absorption regions 31 to 34 in the common cladding 20 in cross section.

The second absorption region 31 is provided between the light guiding structure 11 and the light guiding structure 12. The second absorption region 32 is provided between the light guiding structure 12 and the light guiding structure 13. The second absorption region 33 is provided between the light guiding structure 13 and the light guiding structure 14. Further, the second absorption region 34 is provided between the light guiding structure 14 and the light guiding structure 11.

The second absorption regions 31 to 34 are regions containing a dopant (absorbing material) that absorbs light having a specific wavelength (ultraviolet light) that can change the refractive indexes of the photosensitive regions of the light guiding structures 11 to 14. The second absorption regions 31 to 34 may be regions containing a dopant (fluorescent material) that absorbs excitation light, which is the light having a specific wavelength, and emits fluorescence. The absorbing material and the dopant to be doped to the second absorption regions 31 to 34 may be similar to those to be doped to the first absorption region 30.

In the case of fabricating the MC-SFG using the MCF 1C, change of the refractive indexes of the photosensitive regions of the other light guiding structures 12 to 14 can be suppressed by the ultraviolet laser light not contributing to the formation of the grating in the photosensitive region of the light guiding structure 11.

Figure 9:
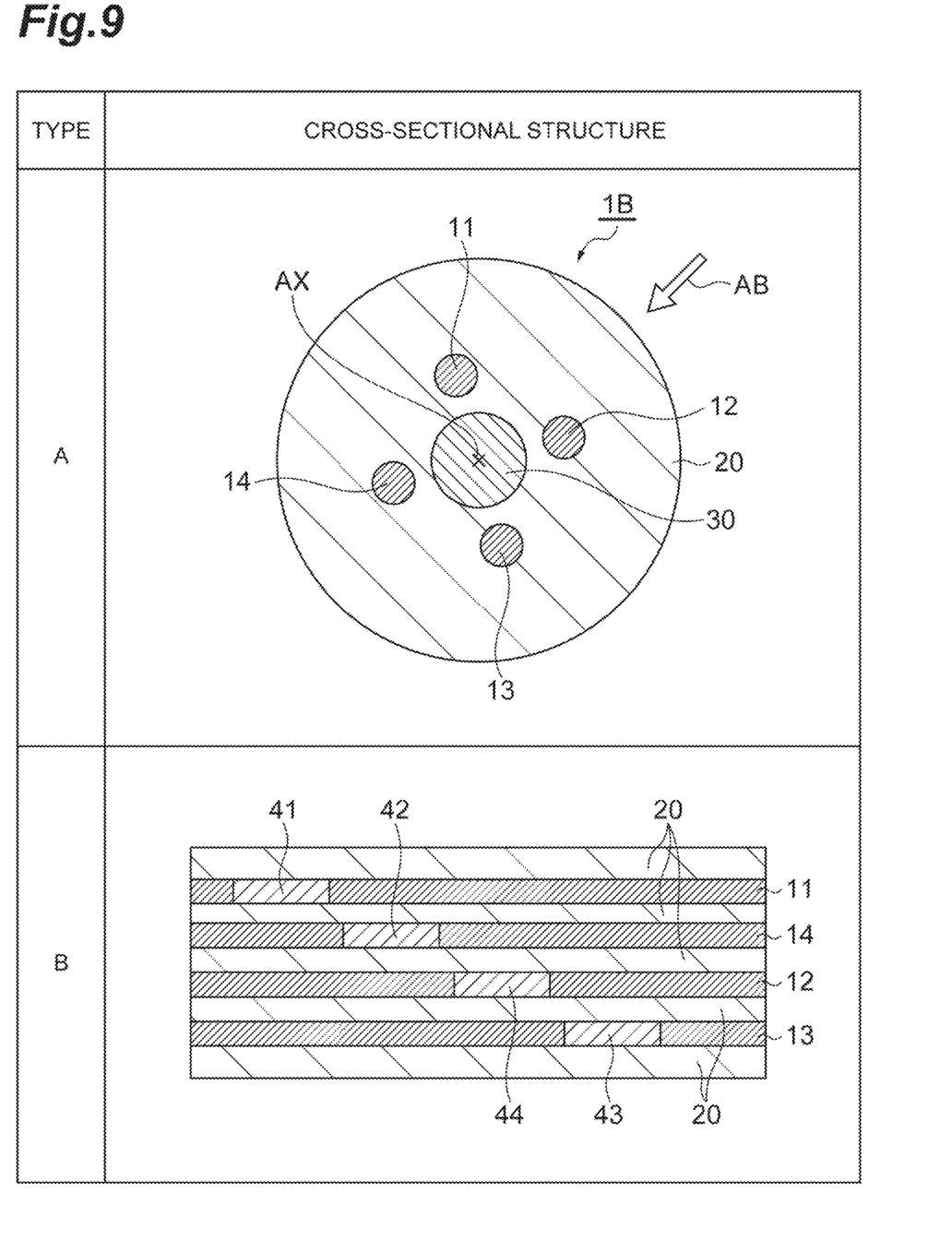
FIG. 9 is a view illustrating a cross-sectional structure of an MC-SFG manufactured using an MCF 1B.

FIG. 9 is a view illustrating a cross-sectional structure of the MC-SFG manufactured using the MCF 1B (Type B illustrated in FIG. 8). Type A in FIG. 9 illustrates a cross section of the MCF 1B perpendicular to the central axis AX (fiber axis). Further, Type B in FIG. 9 illustrates the light guiding structures 11 to 14 of the MCF 1B along the central axis AX as viewed from the direction illustrated by the arrow AB in Type A. As illustrated in Type B, a grating formation region 41 in the light guiding structure 11, a grating formation region 42 in the light guiding structure 12, a grating forming region 43 of the light guiding structure 13, and a grating formation region 44 of the light guiding structure 14 are provided at different positions from one another along the central axis AX (in the longitudinal direction of the MCF 1B).

As described above, the grating can be sequentially formed in the respective photosensitive regions of the light guiding structures 11 to 14 of the MCF 1B by rotating the MCF 1B around the central axis AX by 90 degrees at a time. If the grating formation regions in the respective light guiding structures 11 to 14 are the same region as one another along the central axis AX, the fluorescent material of the first absorption region 30 may be damaged. To avoid such a problem, as illustrated in Type B in FIG. 9, the grating formation regions 41 to 44 in the respective light guiding structures 11 to 14 are favorably provided at different positions from one another along the central axis AX. With such a configuration, damage to the fluorescent material of the first absorption region 30 can be suppressed.

Figure 10:
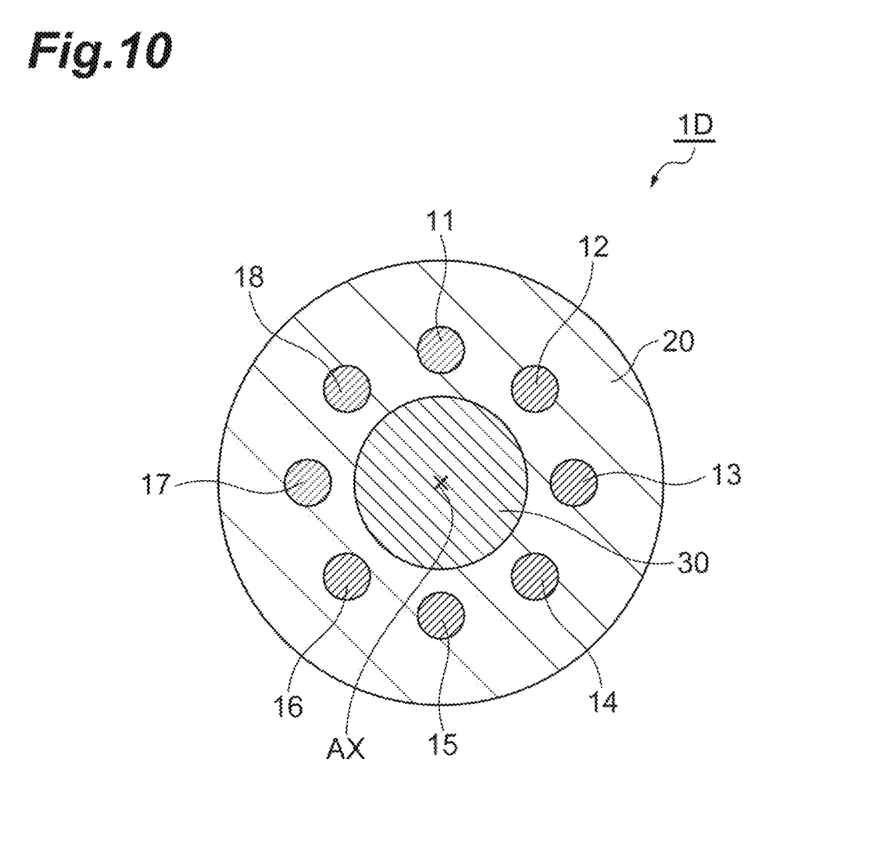
FIG. 10 is a view illustrating a cross-sectional structure of an MCF 1D.

The number of the light guiding structures in the common cladding 20 is not limited to 4, and may be 2, 3, or 5 or more. FIG. 10 is a view illustrating a cross-sectional structure of an MCF 1D. The MCF 1D illustrated in FIG. 10 includes eight light guiding structures 11 to 18 in the common cladding 20. The eight light guiding structures 11 to 18 are arranged at equal intervals on the circumference of a circle centered on the central axis AX. Further, the first absorption region 30 including the cross-sectional center of the MCF 1D is provided in the common cladding 20. Note that the second absorption region may be provided between each two of the light guiding structures 11 to 18.

By use of the MCF according to the present embodiment, fiber Bragg gratings (among them, MC-SFG) with improved ripple characteristics can be easily fabricated Further, according to the present embodiment, the grating can be individually formed in the photosensitive region included in each light guiding structure of the MCF, and therefore transmission spectrums of the gratings written in a plurality of light guiding structures can be individually optimized. For example, a gain spectrum of each light guiding structure may also vary due to manufacturing variation of the light guiding structures of the MC-EDF. Even in such a case, the transmission spectrum of each light guiding structure of the MC-SFG can be individually optimized to match the gain spectrum of each light guiding structure of the MC-EDF.

REFERENCE SIGNS LIST

1 . . . 1A to 1D Multicore optical fiber (MCF);
1 to 18 . . . Light guiding structure;
20 . . . Common cladding;
30 . . . First absorption region;

31 to 34 ... Second absorption region;
100 ... Grating manufacturing device;
111 ... Laser light source;
112 ... Beam diameter adjusting unit;
121 ... Scanning mirror;
122 ... Scanning mirror position adjusting unit;
131 ... Cylindrical lens;
132 ... Cylindrical lens position adjusting unit;
141 ... Phase mask;
142 ... Phase mask position adjusting unit;
151 ... Stage;
152 ... Fixing jig;
160 ... Synchronization control unit;
a ... Core;
b ... First cladding; and
c ... Second cladding.

The invention claimed is:

1. A multicore optical fiber which is mainly comprised of silica glass and comprises: a plurality of light guiding structures each extending in a central axis direction; and a single common cladding surrounding the plurality of light guiding structures, wherein
each of the plurality of light guiding structures includes:
a core extending in the central axis direction, a refractive index of the common cladding being nearly equal to or higher than a refractive index of the core;
a first cladding provided on an outer periphery of the core, the first cladding having a refractive index lower than the refractive index of the core; and
a second cladding provided on an outer periphery of the first cladding, the second cladding having a refractive index higher than the refractive index of the first cladding, lower than the refractive index of the core, and lower than the refractive index of the common cladding, and
at least a part of an inner cladding region, constituted by the first cladding and the second cladding, contains a photosensitive material having photosensitivity of changing a refractive index of a glass region doped with the photosensitive material in response to irradiation of light having a specific wavelength.

2. The multicore optical fiber according to claim 1, wherein
the common cladding except the plurality of light guiding structure contains a dopant for removing an unnecessary component out of the light having the specific wavelength.

3. The multicore optical fiber according to claim 2, wherein
in a cross section of the multicore optical fiber orthogonal to the central axis direction, the common cladding includes a first absorption region, the first absorption region including a center of the cross section and containing, as the dopant, an absorbing material that absorbs the light having the specific wavelength.

4. The multicore optical fiber according to claim 3, wherein
the first absorption region has an absorbance of 0.1 or more and 4 or less at a wavelength of 244 nm.

5. The multicore optical fiber according to claim 3, wherein
the first absorption region contains, as the dopant, a fluorescent material that absorbs the light having the specific wavelength and emits fluorescence, and a percentage of an amount of light to be converted into the fluorescence, out of the light having the specific wavelength, in the first absorption region, is 50% or more and 100% or less.

6. The multicore optical fiber according to claim 3, wherein
the first absorption region has a diameter of is 5 μm or more and 100 μm or less.

7. The multicore optical fiber according to claim 2, wherein
the common cladding includes a second absorption region containing, as the dopant, an absorbing material that absorbs the light having the specific wavelength.

8. The multicore optical fiber according to claim 2, wherein
the dopant includes metal atoms or semiconductor atoms.

9. The multicore optical fiber according to claim 2, wherein
the dopant includes Ge.

10. The multicore optical fiber according to claim 2, wherein
a doping amount of the dopant is 0.1 wt % or more.

11. A fiber Bragg grating comprising:
the multicore optical fiber as set forth in claim 1; and
a grating provided in each of the plurality of light guiding structures of the multicore optical fiber, by spatial refractive index modulation.

12. A method for manufacturing a fiber Bragg grating, the method comprising:
arranging a diffraction grating and a condensing lens, the condensing lens having a focal length of 300 to 1600 mm on a propagation path of ultraviolet light;
installing the multicore optical fiber as set forth in claim 1 so that a distance between a central axis of the multicore optical fiber and a light emission surface of the diffraction grating becomes 250 μm or less;
irradiating the diffraction grating with the ultraviolet light via the condensing lens; and
irradiating any one of the plurality of light guiding structures of the multicore optical fiber with a periodic interference fringe formed by the diffraction grating, to write a grating in the light guiding structure irradiated with the interference fringe.

13. The method according to claim 12, wherein the irradiating includes irradiating each of the plurality of light guiding structures with the interference fringe while rotating the multicore optical fiber around the central axis.

* * * * *